June 1, 1954 M. FLEISIG 2,679,929

RECORD HOLDING AND DISPLAY DEVICE

Filed June 30, 1952

Max Fleisig
INVENTOR

BY Shreve, Crowe & Gordon,
ATTORNEYS

Patented June 1, 1954 2,679,929

UNITED STATES PATENT OFFICE 2,679,929

RECORD HOLDING AND DISPLAY DEVICE

Max Fleisig, Flushing, N. Y.

Application June 30, 1952, Serial No. 296,311

3 Claims. (Cl. 206—62)

The present invention provides improvements in devices for holding and displaying disc records for phonographs and other sound-reproducing devices.

The conventional record album is a well-known accessory in all record libraries and also for presenting collections of such records for distribution and sale. There are also display means for displaying a single record for attracting attention of prospective purchasers, such display means comprising a relatively thick, flat body in which there has been formed a disc-like recess for receiving the record being displayed, there being provided also a hinged cover for the record which is openable like a book for exposing the record to view. These various expedients are imperfect in character, all of them permitting accidental release of the record or records in the album or in the display holder, with attendant danger of breakage of the record.

The present invention provides certain improvements in record display devices of the latter type, it having for one of its objects the provision of an improved structure which is designed to prevent accidental displacement of the record when the device is in displaying position, coupled with means providing ready access to the record for releasing it from its securing means for playing or for closer inspection.

One of the principal objects of this invention is the provision of a phonograph or the like record holder, and means for expeditiously removing the record from the holder, comprising means permitting the record to be readily engaged by the finger and thumb of a person to initiate the lifting of the record from the holder and resilient means automatically tending to remove the record from frictional engagement with the walls of the holder to assist in effecting the ready removal of the record from the holder.

A principal object of this invention is the provision of a phonograph or the like record holder having a recess adapted to snugly receive therein said record, and depressable resilient means extending within said recess engageable with the edge of the record when the latter is positioned within the recess adapted to retain the record in the holder against accidental displacement during handling of the holder.

Further objects and advantages of the present invention will become apparent as the description proceeds, and the features of novelty will be pointed out in particularity in the appended claims.

Figure 1:
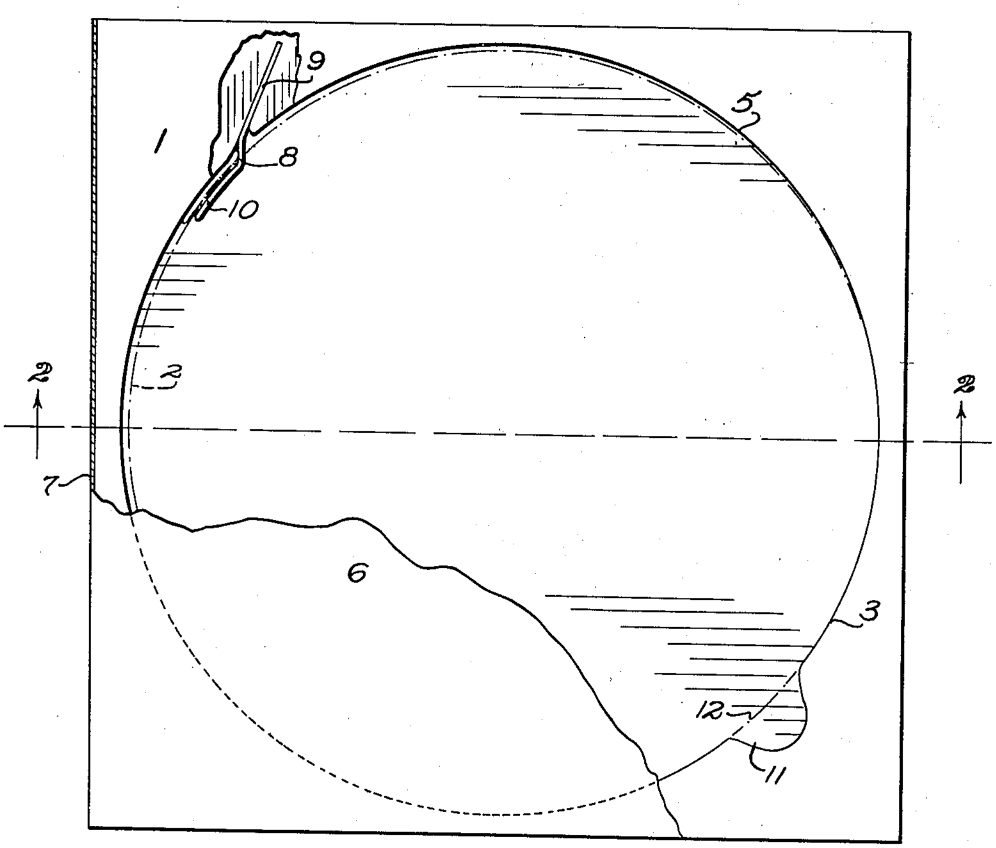
Figure 2:
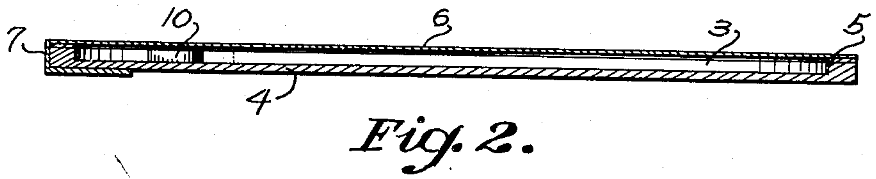

The improvement of the present invention will be understood more readily from the accompanying drawings, in which Fig. 1 represents a plan view of a record display device provided with the improvements of the present invention showing a record in displaying position in the holding device, the view showing parts broken away for structural clarity:

Fig. 2 is a vertical section taken on the line 2—2 of Fig. 1, looking in the direction of the arrows.

Referring more particularly to the drawings, reference numeral 1 represents a flat and rigid mounting body or base for receiving a disc phonograph record 2 in a recess 3 provided in the base 1 for receiving the record. The recess 3 is slightly larger in diameter than the record received therein, and has the bottom portion 4 upon which the record rests, and a side-wall 5 which is slightly deeper than the thickness of the record, this provision enabling a cover member 6 to lie flatly over the record. The recess 3 is substantially concentric with the record 2. The cover 6 is hingedly connected as indicated at 7 to the base member 1, and together with the base member it forms a holder for receiving the record, and the cover 6 is opened and closed by movements similar to the opening and closing of a book, and as the cover is substantially coextensive with the area of the mounting base 1, both as to area and shape, when this cover is closed, it affords a protective cover for both the record and for the base 1.

Obviously, however, the cover 6 might be dispensed with should it be desired to do so, in which event the base portion becomes a record holder in which said base 1 defines a mounting for the record which is received in the recess 3.

It is apparent that either with or without the cover member 6, the display device as described up to this point would be open to the objection that the record would be free to fall out of the recess 3 wherever the mounting base 1, may be tilted, inclined, or manipulated otherwise for bringing the record 2 into a display position. Therefore, the record 2 would be subject to actual or potential breakage whenever the holder containing the record is handled. In view of the usual frequency of such occurrences, and the usually frangible character of the compositions of which the records are made, it is essential to deter such displacements of the record so far as is possible. The present invention therefore contemplates the provision of means which will act upon the record to secure it positively in the recess 3, such means preferably acting on the record to urge the record under a positive pressure against portions of the side-wall 5 that are opposite to such means. A type of pressure-exerting device may be provided which will press against the thickness of the record disc 2, and which will be yieldable to permit ready reinsertion of the record into its recess when the record has been removed and is being replaced in its recess. Therefore, the pressure-exerting device is yieldably resilient and is mounted permanently in the base member 1 at a point adjacent to the recess 3 and extends into the recess for exerting a continuous pressure against the record to cause the record to be secured positively by friction and the pressure of the said device to prevent accidental displacement of the record from the recess. It has been found in practice that the desired result is obtained by a leaf spring 8 having an end 9 mounted permanently into the base member 1 adjacent to the recess 3, an opposite end of the spring, indicated at 10 projecting into the recess from the side-wall 5 thereof. It is not material at what point on the periphery of the recess the spring 8 may be located. It is apparent that the spring 8 is only a light spring which is designed to exert a pressing force against the edge or side of the record to press the record directly laterally against opposite areas of the side-wall 5 of the recess 3, and substantially normal thereto in direction, under not substantially more pressure than is just sufficient to frictionally hold the record in the recess 3 against accidental displacement from the said recess.

Since the recess 3 is substantially concentric with the record 2, it is found desirable in practice, in view of the spring pressure exerted against the record by the spring 8, to provide some means in convenient access to the record for permitting its disengagement from the spring for enabling purposeful removal of the record from the said recess 3.

For the accomplishment of this purpose, there is provided in the base member 1 and opposite to the spring 8 whatever may be the location of the spring relative to the recess 3, a finger notch 11 which opens into the recess 3, as indicated at 12, and diametrically opposite to the spring 8. This notch 11 permits a finger to be inserted and the spring 8 initially resultingly compressed and then tending to urge the record from the wall area adjacent to said spring to enable the record 2 to clear the side-wall 5 of the recess 3 and to be lifted readily out of the recess without danger of breaking the said record.

Replacement of the record 2 in the recess 3 is accomplished by reverse operation. The improvements of the present invention provide a simple expedient which positively secures a disc record in a retaining recess therefor in a display holder notwithstanding what the possible position of the holder may be, thereby minimizing likelihood of the record accidentally dropping from the holder with consequent potential breakage thereof.

The invention contemplates the provision of a display holder for disc phonograph records wherein the record is received in a recess substantially concentric with the record, in which recess there is mounted a resilient member arranged to exert lateral pressure on the record for securing it in the said recess by pressing the said record against portions of the side-wall of the recess that are diametrically opposite to the said resilient member. It will be understood that this member is a leaf-spring such as that indicated at 8 in the accompanying drawings, although other forms of resiliently yieldable pressure members may be employed and fall within the spirit of this invention. Accordingly, it will be apparent that the details of the construction described above and illustrated in the accompanying drawings are subject to variations without departing from functional equivalency to the specific form of the invention herein described, and illustrated or from the spirit of the invention as disclosed herein; and, therefore, it will be understood that it is intended and desired to embrace within the scope of this invention such modifications and changes as may be necessary to adapt the invention to varying conditions and uses, as defined in the appended claims.

What is claimed is:

1. A record holder for disc phonograph records, which comprises a rigid base member defining a mounting for the disc record, the said base member having a recess therein adapted to receive substantially concentrically a disc record and having a continuous side-wall, and a leaf spring having one end permanently mounted in the base member and having an opposite end extending into the recess and bearing laterally against the record for pressing the record laterally against portions of the side-wall of the recess directly opposite to the said leaf-spring, the side-wall defining a lateral abutment for the recess cooperating with the leaf-spring to secure the record against accidental displacement from the recess independently of any position of the holder.

2. A record holder for disc phonograph records, which comprises a rigid base member defining a mounting for the disc record, the said base member having a recess therein adapted to receive substantially concentrically a disc record and having a continuous side-wall, a leaf-spring having one end permanently mounted in the base member adjacent to the recess and having an opposite end extending into the recess and yieldably bearing laterally against the record for pressing the record laterally against portions of the side-wall of the recess directly opposite to the said leaf-spring, the side-wall defining a lateral abutment for the recess cooperating with the leaf-spring to secure the record against accidental displacement from the recess independently of any position of the holder, and a finger notch in the base member projecting from the said recess and opening into the recess in a position diametrically opposite to the projecting end of the leaf-spring whereby upon insertion of a finger in the said notch the record may be removed from the recess by a lifting movement on the record at substantially right angles to the direction of lateral thrust exerted against the record by the said leaf-spring.

3. A record holder as claimed in claim 2 provided with a cover having a hinge connection to the base member along a side thereof, the side-wall of the recess having a depth greater than the thickness of the record for enabling the cover to lie flatly over the record and base member, the cover being substantially of the same size and shape as the base member and being coextensive therewith, the cover member manipulatable between open and closed positions by movement similar to opening and closing of a book.

References Cited in the file of this patent

UNITED STATES PATENTS

| Number | Name | Date |
|---|---|---|
| 774,037 | Buergi | Nov. 1, 1904 |
| 1,000,413 | Kane | Aug. 15, 1911 |
| 1,356,815 | Foresman | Oct. 26, 1920 |
| 2,306,726 | Hasin | Dec. 29, 1942 |